Feb. 1, 1955  F. ABEL  2,700,862
LAWN MOWER WITH SAFETY DEVICE
Filed June 24, 1953

INVENTOR.
FREDERICK ABEL
BY Marechal Biebel French & Bugg
ATTORNEYS

United States Patent Office 2,700,862
Patented Feb. 1, 1955

2,700,862

LAWN MOWER WITH SAFETY DEVICE

Frederick Abel, Dayton, Ohio, assignor to The Huffman Manufacturing Company, Dayton, Ohio, a corporation of Ohio Application June 24, 1953, Serial No. 363,731

1 Claim. (Cl. 56—25.4)

This invention relates to power lawn mowers and more particularly to rotary power lawn mowers of the type wherein a cutting disk or knife member is supported for rotation on a vertical axis.

In lawn mowers of this rotary type, the cutter member is usually substantially concealed beneath the main body or casing which supports the motor, and it is therefore not usually possible for the operator to determine from a normal standing position whether the cutter member is rotating or stationary. In addition, while an internal combustion engine is usually sufficiently noisy to indicate when it is operating, this is not ordinarily the case with an electric motor. Furthermore, with either type of motor, the cutter member may take a considerable time to decelerate and stop after the motor is shut off, during which time injury could result if the operator should put his hand or other part of his body within range of the cutter.

The present invention accordingly has as a primary object to provide an indicator for incorporation with a lawn mower of the rotary type to demonstrate to the operator whether the cutter member is stationary or rotating, and more particularly to provide such an indicator which is readily visible and intelligible to the operator standing in normal position and which is of such nature as to have a distinctively different appearance when stationary as compared with its appearance when the cutters are rotating above a speed at which contact therewith would be dangerous, and thereby to prevent any possible misinterpretation thereof.

It is a further object of the invention to provide an indicator for the above purpose which carries a legend such as one or more printed words or other characters reproduced in colors so contrasting with the surrounding area of the indicator and of such proportions as to be easily readable when stationary but to give the appearance of one or more contrasting solid bands of color when the indicator is rotating with the rotary shaft and cutter member.

Other objects and advantages of the invention will be apparent from the following description, the accompanying drawing and the appended claim.

In the drawing—

Figure 1:
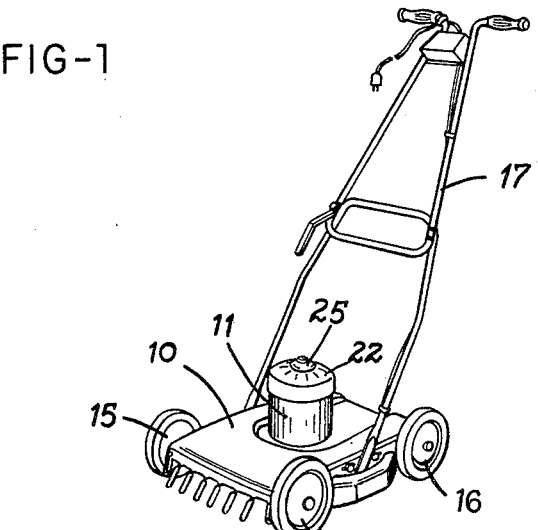
Fig. 1 is a view in perspective showing an electrical rotary lawn mower constructed in accordance with the present invention.
Figure 2:
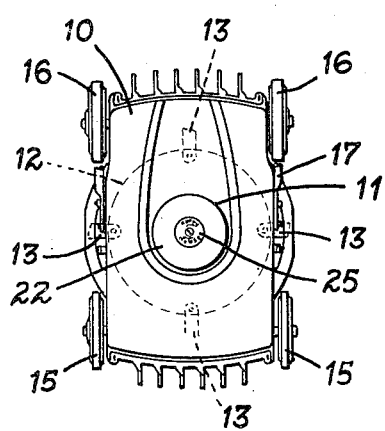
Fig. 2 is a top view of the main body or casing of the mower with the handle partially removed.

Referring to the drawing, which illustrates a preferred embodiment of the invention, the lawn mower includes a main body casing 10 formed of sheet material on which is mounted motor 11 having its axis arranged vertically. The cutting means of the mower includes a disk-shaped carrier 12 supported within casing 10 on the drive shaft of motor 11 for rotation above the ground, and this carrier has thereon a plurality of blades 13 for cutting the grass as the carrier rotates. The casing 10 is supported by a pair of front wheels 15 and a pair of rear wheels 16, and the guiding handle is shown at 17.

Figure 3:
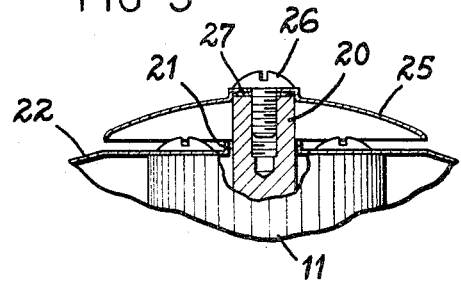
Fig. 3 is an enlarged fragmentary central sectional view showing the indicator disk of the invention mounted on the motor shaft.

As shown especially in Fig. 3, the motor drive shaft is provided with an extension 20 at its upper end which projects through an appropriate opening 21 in the top cover 22 of the motor. The indicator disk 25 of the invention is secured to the upper end of extension 20 by means of a screw 26 and lock washer 27 for rotation with the motor shaft. As pointed out above, the upper surface of disk 25 carries indicia of such characteristics as to give to the disk a distinctively different appearance when it is rotating as compared with its appearance when the disk and motor shaft are stationary.

Figure 4:
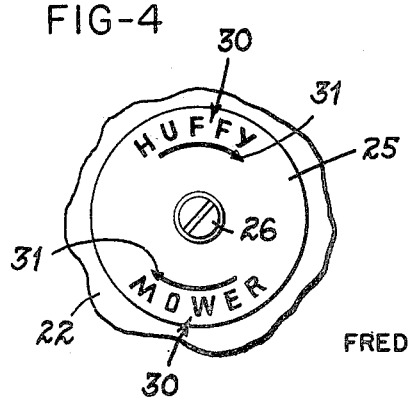
Fig. 4 is a detail top view showing the appearance of the indicator disk when stationary.

Referring to Fig. 4, the indicia on disk 25 are shown as composed of two words 30 spelled out at opposite sides of the disk in letters of substantial size, for example one-quarter inch in height. In addition, an arrow 31 is located between each word 30 and the center axis of the disk. These indicia, moreover, are reproduced in a color or colors contrasting strongly with the surrounding area of the disk, satisfactory results having been obtained with the indicia being bright yellow on a red background.

Figure 5:
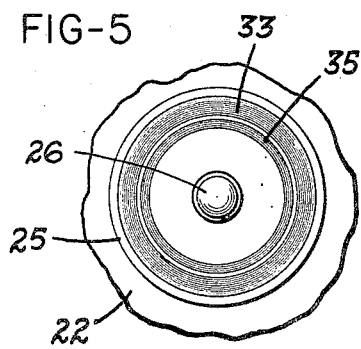
Fig. 5 is a view similar to Fig. 4 showing the appearance of the indicator disk when it is rotating at motor speed.

With this arrangement, when the motor and disk are stationary, the disk will have the appearance shown in Fig. 4, and the words or other indicia thereon are easily readable by the operator in normal operating position so that he will know that the cutters are stationary. When, however, the motor shaft is rotated at a speed sufficient for the cutter blades to be dangerous, the disk 25 will have the entirely different appearance shown in Fig. 5. Instead of easily discernible characters, the words 30 of Fig. 4 will blend to give an appearance of an outer solid annular band of color 33, and the arrows 31 will blend to give an inner annular band of color 35 concentric with the outer band 30.

The operator, therefore, can easily tell at a glance whether the blade carrier is stationary, in which event it is safe to approach the blades, or whether the blades are still being rotated at a speed within the danger range. In addition, with the disk 25 of substantially smaller radius than the effective radius for the several cutter blades, the peripheral speed of the disk will be correspondingly less than the blades, satisfactory results having been obtained with the radius of the disk being approximately one-eighth that of the blades. The operator can therefore begin to distinguish the individual characters forming the indicia on the disk as the motor decelerates but at the same time will know that the cutters are still rotating at a dangerous speed if he is unable to read the indicia clearly. This is especially desirable with a mower having a carrier disk for the blades as distinguished from a cutter bar, because the flywheel effect of such a carrier will cause it to coast for a considerable time after the motor is shut off, and thus the operator may expect the cutters to stop before they actually do.

This same feature of progressive change in the appearance of the disk is also of value as indicating deceleration resulting from jamming or other overloading of the motor, since the operator will thereby be advised in time to relieve the overloading condition before the motor stalls. In addition, since motors of the illustrated type are commonly provided with a thermal protective device including bimetallic elements effective to shut off the motor in the event of overheating of the motor windings, and which must be permitted to cool before restarting of the motor, such possible time loss is eliminated by reason of the indication to the operator of the necessity for reducing the load before excessive overheating can occur. Similarly, with the device of the invention indicating overloaded conditions in time to permit the operator to reduce the load on the motor before overheating, it is possible to eliminate the conventional thermal protective devices and to rely on this visual warning to the operator.

The invention thus provides a simple safety device which not only is easy to incorporate with the mower, as well as highly effective for its intended purpose, but which also enhances the appearance of the mower by furnishing a decorative top cap for the motor cover. It will of course be apparent that the particular characters employed to form the indicia on the disk may be varied, as well as the particular color combination. In any case, however, care should be taken to utilize characters of an easily identified type in stationary position and of a color or colors contrasting with their surrounding area in order to assure the desired distinctive appearance of the disk and indicia at all times for proper interpretation by the operator.

While the form of device herein described constitutes a preferred embodiment of the invention, it is to be understood that the invention is not limited to this precise form of device, and that changes may be made therein without departing from the scope of the invention which is defined in the appended claim.

What is claimed is:

In a power lawn mower including a main body having a motor mounted thereon with the drive shaft thereof substantially vertical and having a cutting member supported on said drive shaft for rotation on a vertical axis in substantially concealed relation with said body for driving said cutting member on a vertical axis, an indicator for demonstrating to the operator whether said motor and cutting member are stationary or in dangerous operation comprising a disk, means including an extension of said shaft supporting said disk above said motor and said body on said drive shaft for rotation with said drive shaft, indicia on said disk composed of separate characters arranged concentrically about said axis in angularly spaced relation for ready identification by the operator when said disk is stationary, the major portion of said disk being of a first predetermined color, said characters being of substantial radial dimensions and of a second predetermined color contrasting with said first color of the surrounding area of said disk to provide an appearance of a solid annular band of a color which is substantially the combination of both said colors when said disk is rotating above a speed at which contact with the cutting member would be dangerous, and said disk being of materially smaller radius than said cutting member to cause the appearance of said characters to change from said solid band at relatively slow speeds of said cutting member while preventing positive identification thereof except when said cutter member is substantially stationary.

References Cited in the file of this patent

UNITED STATES PATENTS

| | | |
|---|---|---|
| 1,815,916 | Keltie | July 28, 1931 |
| 2,265,545 | Phelps | Dec. 9, 1941 |
| 2,504,416 | Hileman | Apr. 18, 1950 |
| 2,643,502 | Flanigan | June 30, 1953 |